(12) United States Patent
Choi

(10) Patent No.: US 6,918,852 B2
(45) Date of Patent: Jul. 19, 2005

(54) SPEED CHANGE GEAR FOR AUTOMATIC TRANSMISSION

(75) Inventor: Hyun Young Choi, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/617,788

(22) Filed: Jul. 14, 2003

(65) Prior Publication Data
US 2004/0014549 A1 Jan. 22, 2004

(30) Foreign Application Priority Data
Jul. 16, 2002 (JP) ........................... 2002-207330

(51) Int. Cl.$^7$ ............................................. F16H 3/62
(52) U.S. Cl. ...................................... 475/284; 475/275
(58) Field of Search ................................ 475/275, 284, 475/296

(56) References Cited

U.S. PATENT DOCUMENTS

| | | | | |
|---|---|---|---|---|
| 6,231,471 B1 * | 5/2001 | Park | ........................... | 475/325 |
| 6,270,444 B1 * | 8/2001 | Tsutsui et al. | .............. | 477/143 |
| 6,302,820 B1 * | 10/2001 | Ried | ........................... | 475/276 |
| 6,422,968 B1 * | 7/2002 | Coffey | ........................ | 475/275 |
| 6,752,737 B2 * | 6/2004 | Ishimaru et al. | ........... | 475/275 |

FOREIGN PATENT DOCUMENTS

| | | | | |
|---|---|---|---|---|
| JP | 402154844 | * | 6/1990 | ................ 475/276 |
| JP | 2000-055152 A | | 2/2000 | |

OTHER PUBLICATIONS

U.S. Appl. No. 10/619,724, filed Jul. 16, 2003, Ishimaru.
U.S. Appl. No. 10/614,827, filed Jul. 9, 2003, Tsuga.
U.S. Appl. No. 10/446,869, filed May 29, 2003, Tsuga.
U.S. Appl. No. 10/619,559, filed Jul. 16, 2003, Taguchi.
U.S. Appl. No. 10/619,459, filed Jul. 16, 2003, Ishimaru.
U.S. Appl. No. 10/617,787, filed Jul. 14, 2003, Ikeda.

* cited by examiner

Primary Examiner—Ha Ho
(74) Attorney, Agent, or Firm—Foley & Lardner LLP (57) ABSTRACT

A speed change gear for an automatic transmission includes: an input portion; an output portion; and a plurality of planetary gear sets including a compound planetary gear set. The plurality of the planetary gear sets has a clutch and a brake. The clutch includes a first clutch and a second clutch for connecting and disconnecting the reduced rotation from a speed reduction planetary gear set to the compound planetary gear set, and a third clutch which is a direct clutch for outputting the input rotation at a constant speed to the compound planetary gear set. The third clutch is disposed radially outward relative to a first ring gear of the speed reduction planetary gear set. The first ring gear has an outer periphery which is provided with a clutch hub. The clutch hub constitutes the direct clutch and is an input member to the third clutch.

7 Claims, 7 Drawing Sheets

| GEAR SHIFT | FRICTION ELEMENT | C1 | C2 | C3 | B1 | B2 |
|---|---|---|---|---|---|---|
| FORWARD | FIRST GEAR | ○ | | | ○ | |
| | SECOND GEAR | ○ | | | | ○ |
| | THIRD GEAR | ○ | ○ | | | |
| | FOURTH GEAR | ○ | | ○ | | |
| | FIFTH GEAR | | ○ | ○ | | |
| | SIXTH GEAR | | | ○ | | ○ |
| REVERSE GEAR | | | ○ | | ○ | |

SPEED CHANGE GEAR FOR AUTOMATIC TRANSMISSION

BACKGROUND OF THE INVENTION

1. Field of the Invention

The present invention relates to a speed change gear for an automatic transmission. The speed change gear has an arrangement of a speed reduction planetary gear set for reducing a rotation from a power source (engine and the like) and a latter speed change mechanism for inputting the thus reduced rotation. The speed reduction planetary gear set includes a ring gear having an outer periphery which is provided with a direct clutch for transmitting the rotation from the power source (engine and the like) to the latter speed change mechanism.

Moreover, the present invention relates to a technology for making a gear train smaller.

2. Description of the Related Art

For reduced fuel consumption and improved drivability, recently, an automatic transmission is likely to have the greater and greater number of gear shifts.

Japanese Patent Unexamined Publication No. P2000-55152 (=JP2000055152) discloses a conventional technology for reducing a gear noise by improving on-vehicle mountability. More specifically, the above improvement is made by preventing the automatic transmission (achieving six forward gears and one reverse gear) from becoming increased in axial length.

Figure 8:
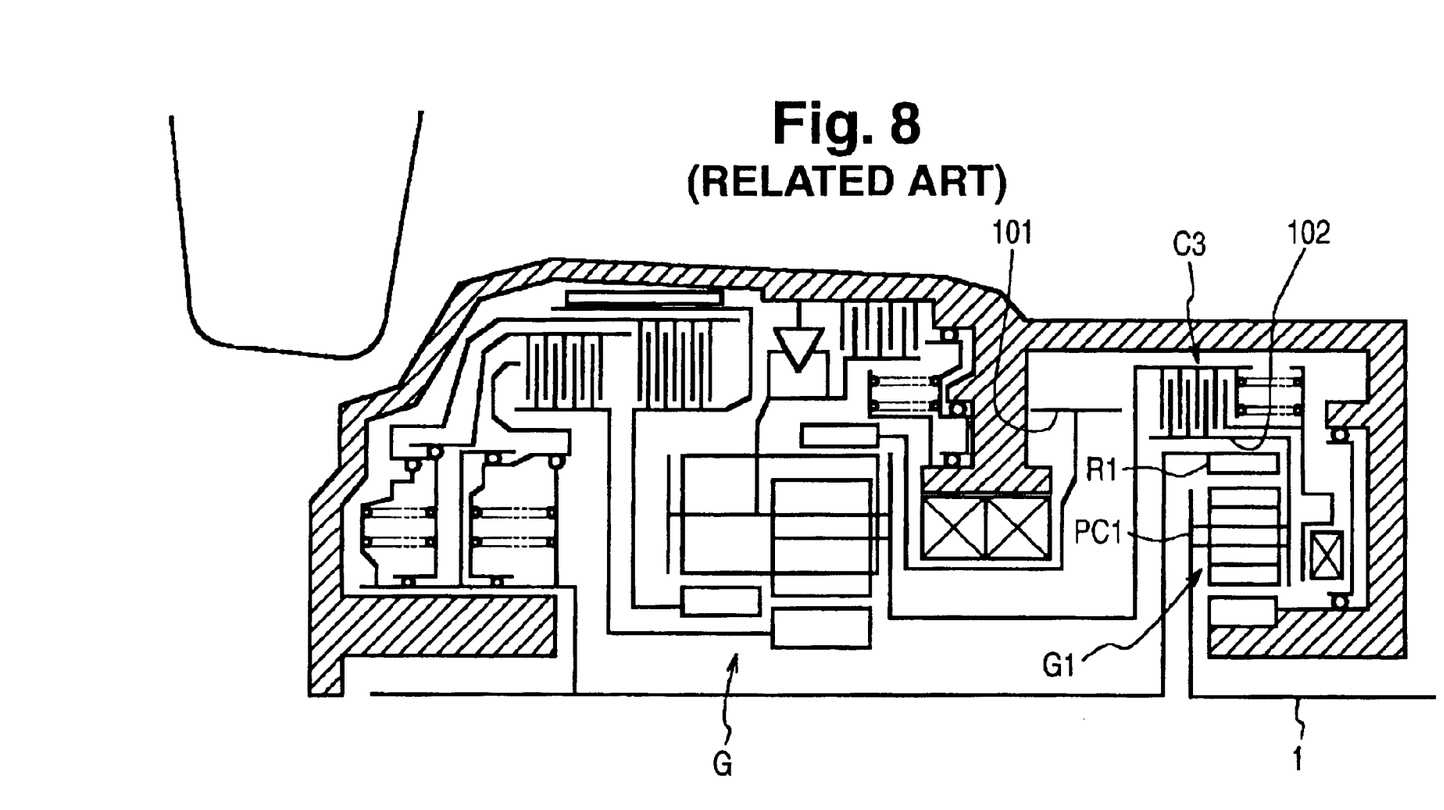
FIG. 8 shows an automatic transmission achieving six forward gears and one reverse gear, according to a related art, in which improving on-vehicle mountability attributable to prevention of increase in axial length reduces gear noise.

As is seen in FIG. 8, a speed change gear for an automatic transmission according to Japanese Patent Unexamined Publication No. P2000-55152 (=JP2000055152) has a speed reduction planetary gear set G1 and a counter gear 101 which are disposed in the vicinity of a front end (substantially in the center of the vehicle) of the transmission. The above speed reduction planetary gear set G1 is of a double pinion type which transmits a rotation from an input shaft 1 of the transmission to a direct clutch C3 via a planetary carrier PC1, with the direct clutch C3 disposed on an outer periphery of the speed reduction planetary gear set G1 and with the counter gear 101 disposed rearward (leftward in FIG. 8) relative to the speed reduction planetary gear set G1. With the above constitution, namely, disposing the speed reduction planetary gear set G1 and the counter gear 101 close to the front end (substantially the center of the vehicle) of the transmission can reduce the gear noise. In addition, overlapping members of the speed reduction planetary gear set G1 in the above constitution can reduce the transmission in overall length.

For increasing freedom (flexibility) of gear ratio of a final gear on the front end of the transmission, a differential ring gear (not shown) needs to secure a great outer diameter, relative to a distance between a main shaft and a differential shaft of a gear train.

The above overlapping constitution of members of the speed reduction planetary gear set G1 according to Japanese Patent Unexamined Publication No. P2000-55152 (=JP2000055152) includes the direct clutch C3 that has a clutch hub 102 disposed radially outward relative to a first ring gear R1 of the speed reduction planetary gear set G1, as is seen in FIG. 8. With the clutch hub 102 of the direct clutch C3, securing the great outer diameter of the differential ring gear (not shown) relative to the distance between the main shaft and the differential shaft of the gear train is of difficulty for the following reason:

In a radial direction of the gear train, an area is to be secured equivalent to thickness of the clutch hub 102 added by a gap between the clutch hub 102 and the first ring gear R1.

BRIEF SUMMARY OF THE INVENTION

It is an object of the present invention to provide a speed change gear for an automatic transmission which speed change gear can secure a great outer diameter of a differential ring gear relative to a distance between a main shaft and a differential shaft of a gear train, by preventing greater radial diameter in the course of axial length reduction of the automatic transmission which reduction is necessary for the increased number of gear shifts.

According to an aspect of the present invention, there is provided a speed change gear for an automatic transmission. The speed change gear includes: 1) an input portion for inputting an input rotation from a power source; 2) an output portion disposed substantially coaxially with the input portion and outputting an output rotation of the speed change gear; and 3) a plurality of planetary gear sets including a compound planetary gear set, the plurality of the planetary gear sets providing a plurality of power conductive paths to an area defined between the input portion and the output portion. The plurality of the planetary gear sets includes: a first clutch; a second clutch; a third clutch; a first brake; and a second brake. The clutches and the brakes are configured to be selectively engaged and disengaged in such a manner that the planetary gear sets change a rotation from the input portion at a corresponding gear change ratio by selecting one of the plurality of the power conductive paths, thereby outputting the thus changed rotation to the output portion. Combinations of engaged clutches and brakes and combinations of multiple engaged clutches define at least six successive forward gears and one reverse gear. One of the plurality of the planetary gear sets is a speed reduction planetary gear set for continuously reducing the input rotation and outputting the thus reduced rotation. In the first through the fifth forward gears, the first clutch and/or the second clutch is/are engaged to transfer the reduced rotation from the speed reduction planetary gear set to the compound planetary gear set. The third clutch, which is a direct clutch for outputting the input rotation to the compound planetary gear set, is disposed radially outward relative to a first ring gear of the speed reduction planetary gear set. The first ring gear has an outer periphery that is provided with a clutch hub. The clutch hub constitutes the direct clutch and is an input member to the third clutch.

The other object(s) and feature(s) of the present invention will become understood from the following description with reference to the accompanying drawings.

BRIEF DESCRIPTION OF THE SEVERAL VIEWS OF THE DRAWINGS

FIG. 3 shows torque flow paths at each gear shift of the speed change gear according to the embodiment, in which:

FIG. 4 shows torque flow paths at each gear shift of the speed change gear according to the embodiment, in which:

FIG. 6 is a view of a developed cross section showing an actual constitution of the speed change gear in FIG. 1 to FIG. 5, according to the embodiment, in which:

the speed change gear has an input portion 1 and an output portion 2 reversed relative to those shown by the skeleton diagrams in FIG. 1, FIG. 3, FIG. 4 and FIG. 5.

DETAILED DESCRIPTION OF THE EMBODIMENT

In the following, a certain embodiment of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

Figure 1:
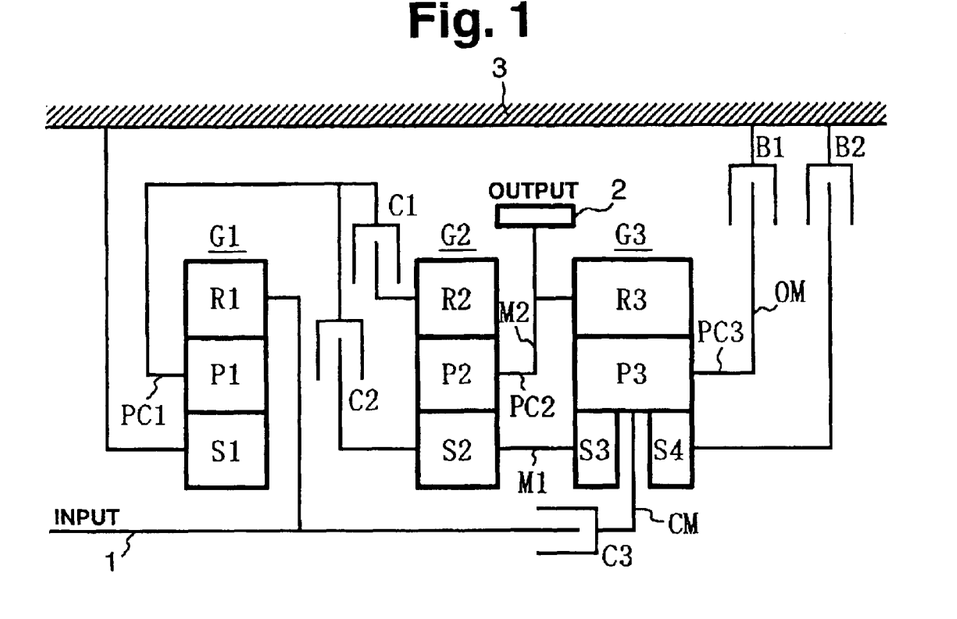
FIG. 1 is a typical skeleton diagram of a speed change gear for an automatic transmission, according to an embodiment of the present invention.

FIG. 1 shows a typical skeleton diagram of a speed change gear for an automatic transmission, according to an embodiment of the present invention. There are provided a first planetary gear set G1, a second planetary gear set G2, a third planetary gear set G3, a first connector member M1, a second connector member M2, a first clutch C1, a second clutch C2, a first brake B1, a second brake B2, an input portion INPUT (input shaft 1), and an output portion OUTPUT (output gear 2).

The speed change gear for the automatic transmission according to the embodiment is so constituted that the first planetary gear set G1 (speed reduction, single pinion), the second planetary gear set G2 (single pinion), and the third planetary gear set G3 (double sun gear) are sequentially and substantially coaxially arranged from a left end (an end close to the input portion INPUT [input shaft 1]), as is seen in FIG. 1.

The first planetary gear set G1 constitutes a speed reduction planetary gear set G1, while the second planetary gear set G2 and the third planetary gear set G3 constitute a speed change planetary gear set (a latter speed change mechanism).

The first planetary gear set G1 has a first sun gear S1, a first ring gear R1, a first pinion P1 meshing with the first sun gear S1 and the first ring gear R1, and a first planetary carrier PC1 for carrying the first pinion P1 in such a manner that the first pinion P1 can rotate, thus constituting the single pinion planetary gear set (speed reduction planetary gear set G1).

The second planetary gear set G2 has a second sun gear S2, a second ring gear R2, a second pinion P2 meshing with the second sun gear S2 and the second ring gear R2, and a second planetary carrier PC2 for carrying the second pinion P2 in such a manner that the second pinion P2 can rotate, thus constituting the single pinion planetary gear set.

The third planetary gear set G3 has a third sun gear S3, a fourth sun gear S4, a third pinion P3 meshing with the third sun gear S3 and the fourth sun gear S4 in common, a third planetary carrier PC3 for carrying the third pinion P3 in such a manner that the third pinion P3 can rotate, and a third ring gear R3 (one in number) meshing with the third pinion P3, thus constituting the double sun gear planetary gear set. Hereinabove, the third sun gear S3 is disposed on a nearer side to the input portion INPUT, while the fourth sun gear S4 is disposed on a farther side from the input portion INPUT.

Although the third sun gear S3 and the fourth sun gear S4 are disposed substantially coaxially, the numbers of teeth thereof need not to be equal (in other words, the different numbers of teeth are allowed).

The third planetary carrier PC3 is provided with a center member CM united with the third planetary carrier PC3 and extending radially inward from between the third sun gear S3 and the fourth sun gear S4, and is provided with an outer member OM extending radially outward from the third planetary carrier PC3. The outer member OM is disposed actually in a special manner (to be described in detail afterward).

The center member CM is disposed so as to pass through a space that is defined on a circle formed with pitches arranged on the third pinion P3 and that is defined between the adjacent third pinions P3. The center member CM is disposed so as to extend radially inward from between the third sun gear S3 and the fourth sun gear S4.

The input portion INPUT is constituted of the input shaft 1. The connection of the input shaft 1 to the first ring gear R1 and the connection of the input shaft 1 to an engine (not shown), which acts as power source via a torque converter (not shown), allows the engine speed to be inputted from the input shaft 1 to the first ring gear R1.

The output portion OUTPUT is constituted of an output gear 2. The output gear 2 substantially coaxially connects to the second connector member M2 (constituting a coupling body for coupling the second planetary carrier PC2 and the third ring gear R3), thus sending transmitted (changed speed) output rotation from the output gear 2 to a drive wheel of a vehicle via a final gear set (not shown) and a differential gear device (not shown).

Hereinabove, the first connector member M1 is a connector member for connecting the second sun gear S2 and the third sun gear S3 unitedly, thus constituting a coupling body for coupling the second sun gear S2 and the third sun gear S3.

Being connected to a transmission case 3, the first sun gear S1 of the speed reduction planetary gear set G1 is held continuously stationary. The first planetary carrier PC1 is adapted to be connected to the second ring gear R2 by the first clutch C1, and is adapted to be connected to the second sun gear S2 by the second clutch C2.

The center member CM of the third planetary carrier PC3 is adapted to be connected to the input shaft 1 by the third clutch C3, thus allowing the third clutch C3 to act as a direct clutch outputting the input rotation to a compound planetary gear set (including the second planetary gear set G2 and the third planetary gear set G3).

The outer member OM of the third planetary carrier PC3 of the double sun gear planetary gear set G3 is adapted to be connected to the transmission case 3 by the first brake B1, and is adapted to hold stationary the third planetary carrier PC3. The fourth sun gear S4 is adapted to be connected to the transmission case 3 by the second brake B2, and thereby is adapted to be held stationary.

Figure 2:
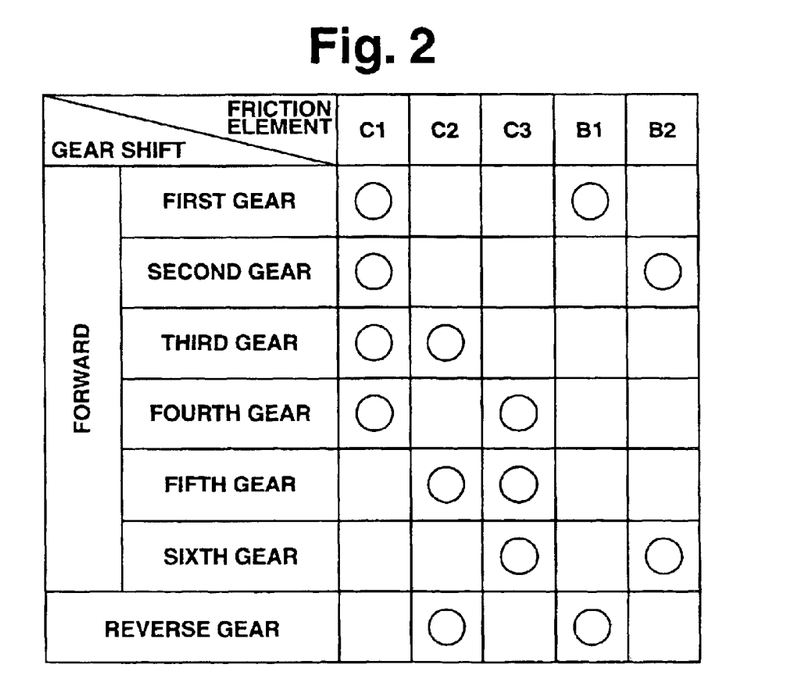
FIG. 2 shows an engagement logic of a transmission friction element of the speed change gear, relative to a selected gear shift.

With the speed change gear having the above constitution according to the embodiment, engaging and disengaging the first clutch C1, the second clutch C2, the third clutch C3, the first brake B1, and the second brake B2 referring to combinations shown in FIG. 2 (a circle stands for engagement while a blank stands for disengagement) can select corresponding gear shifts (six forward gears and one reverse gear). A control valve body (not shown) for transmission control achieving engagement logic for the applicable transmission is connected to the first clutch C1, the second clutch C2, the third clutch C3, the first brake B1, and the second brake B2.

The control valve body (not shown) for the transmission control is of a hydraulic pressure control type, an electronically control type, a combination of the former two, or the like.

Hereinafter described is transmission operation of the above speed change gear according to the embodiment, referring to FIG. 2 to FIG. 5.

FIG. 2 shows an engagement logic of a transmission friction element of the speed change gear, relative to a selected gear shift.

Figure 4A:
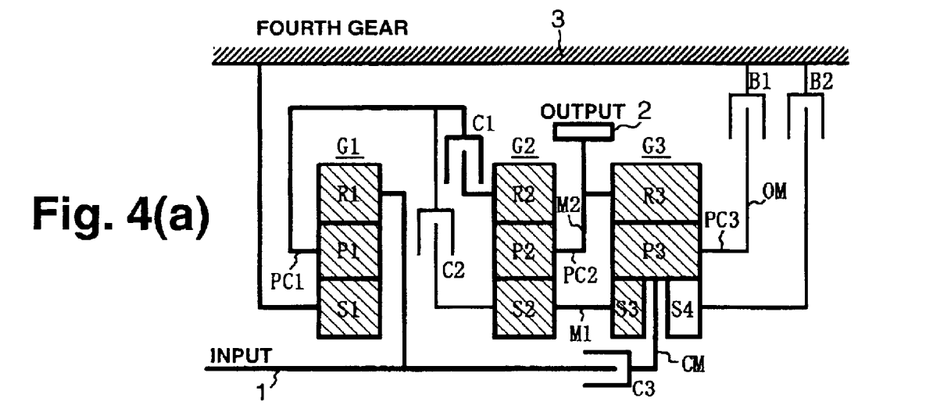
FIG. 4(a) is a typical skeleton diagram similar to that in FIG. 1 at a fourth gear.
Figure 4B:
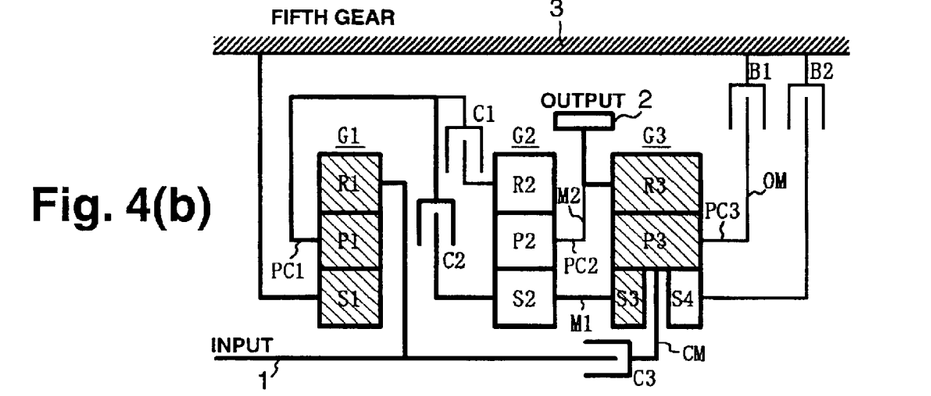
FIG. 4(b) is a typical skeleton diagram similar to that in FIG. 1 at a fifth gear.
Figure 4C:
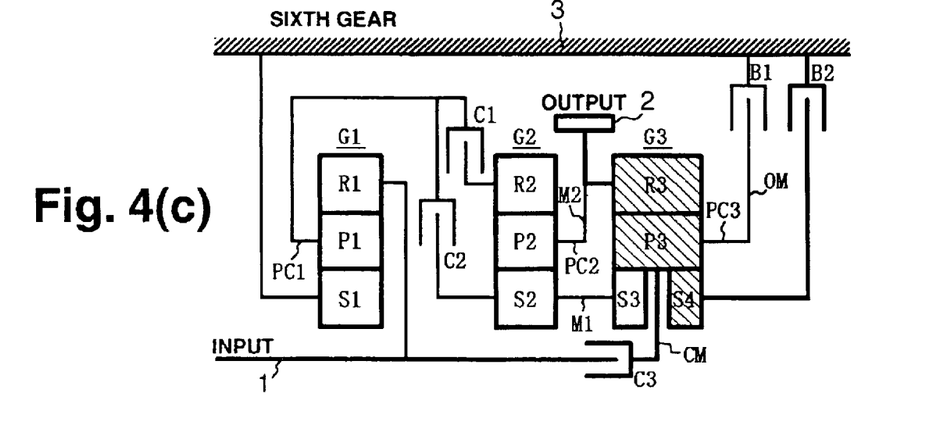
FIG. 4(c) is a typical skeleton diagram similar to that in FIG. 1 at a sixth gear.
Figure 5:
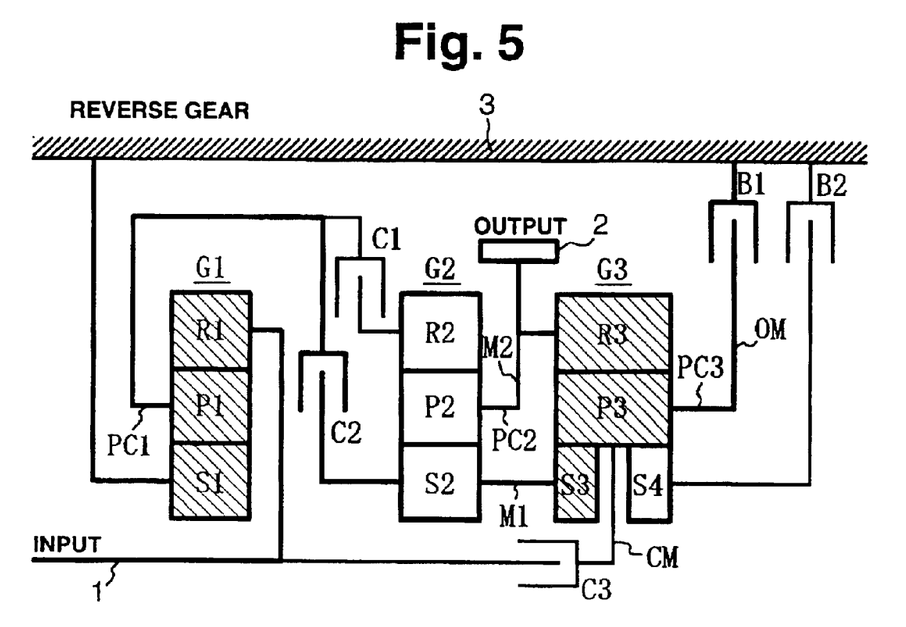
FIG. 5 shows torque flow paths at a reverse gear shift of the speed change gear according to the embodiment, with a typical skeleton diagram similar to that in FIG. 1.

FIG. 3 to FIG. 5 show torque flow paths at each gear shift of the speed change gear, according to the embodiment.

In FIG. 3 to FIG. 5, the torque flow paths of the clutch, the brake and the member are shown with a bold line, and the gear used for the torque flow is hatched.

(First Gear)

As is seen in FIG. 2, engaging the first clutch C1 and the first brake B1 may achieve the forward first gear.

At the first gear, in view of the second planetary gear set G2, engaging the first clutch C1 may input a reduced rotation from the first planetary gear set G1 to the second ring gear R2.

On the other hand, in view of the third planetary gear set G3, engaging the first brake B1 may hold stationary the third planetary carrier PC3 to the transmission case 3, thus rotation of the third sun gear S3 is reversed and reduced relative to an output rotation from the third ring gear R3. The rotation of the third sun gear S3 is transmitted to the second sun gear S2 of the second planetary gear set G2 via the first connector member M1.

In view of the second planetary gear set G2, a forward reduced rotation is inputted from the second ring gear R2 while the reverse reduced rotation is inputted from the second sun gear S2, thus further reducing the rotation from the second ring gear R2. The thus further reduced rotation is to be outputted from the second planetary carrier PC2 to the output gear 2 via the second connector member M2.

Figure 3A:
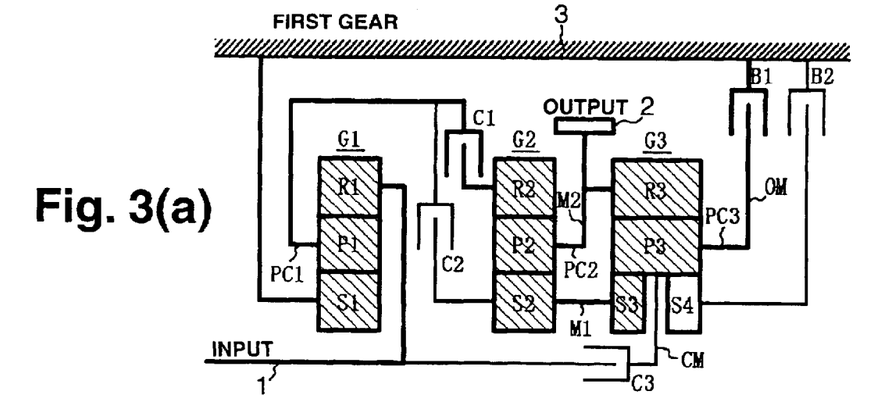
FIG. 3(a) is a typical skeleton diagram similar to that in FIG. 1 at a first gear.

FIG. 3(a) shows the torque flow paths at the first gear, with the first clutch C1, the first brake B1 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

In other words, at the first gear, all the planetary gear sets including the first planetary gear set G1 and the latter speed change mechanism (including the second planetary gear set G2 and the third planetary gear set G3) may contribute to the torque flow.

(Second Gear)

As is seen in FIG. 2, disengaging the first brake B1 (which is engaged at the first gear) while engaging the second brake B2, namely, engaging the first clutch C1 and the second brake B2 may achieve the forward second gear.

At the second gear, in view of the second planetary gear set G2, engaging the first clutch C1 may input the reduced rotation from the first planetary gear set G1 to the second ring gear R2.

On the other hand, in view of the third planetary gear set G3, engaging the second brake B2 may hold stationary the fourth sun gear S4 to the transmission case 3, thus holding stationary the third sun gear S3 which is connected to the fourth sun gear S4 by the third pinion P3. Then, the second sun gear S2 connected to the third sun gear S3 via the first connector member M1 may be held stationary to the transmission case 3.

In view of the second planetary gear set G2, the forward reduced rotation is inputted from the second ring gear R2 while the second sun gear S2 is held stationary, thus further reducing the reduced rotation from the second ring gear R2. The thus further reduced rotation (although faster than the first speed) is to be outputted from the second planetary carrier PC2 to the output gear 2 via the second connector member M2.

Figure 3B:
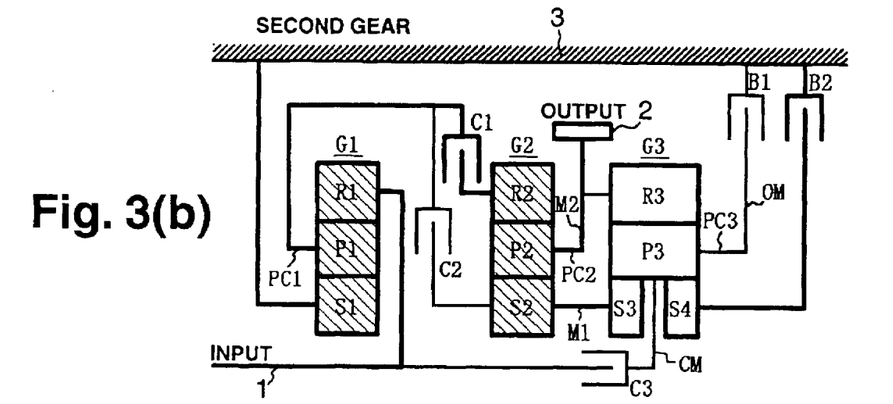
FIG. 3(b) is a typical skeleton diagram similar to that in FIG. 1 at a second gear.

FIG. 3(b) shows the torque flow paths at the second gear, with the first clutch C1, the second brake B2 and each of the members indicated by the bold line and with the first planetary gear set G1 and the second planetary gear set G2 hatched. Hereinabove, the bold line and the hatching teach that the torque is operated.

In view of the third planetary gear set G3, the third pinion P3 free of constraint may revolve around the stationary sun gear S3 and the stationary sun gear S4 in accordance with the output rotation of the third ring gear R3. In sum, although acting as a rotation member, the third planetary gear set G3 may make substantially no contribution to the torque flow.

(Third Gear)

As is seen in FIG. 2, disengaging the second brake B2 (which is engaged at the second gear) while engaging the second clutch C2, namely, engaging the first clutch C1 and the second clutch C2 may achieve the forward third gear.

At the third gear, in view of the second planetary gear set G2, engaging the first clutch C1 may input the reduced rotation from the first planetary gear set G1 to the second ring gear R2. Substantially simultaneously with this, engaging the second clutch C2 may input the reduced rotation from the first planetary gear set G1 to the second sun gear S2 of the second planetary gear set G2.

In view of the second planetary gear set G2, substantially the same reduced rotation is inputted to the second ring gear R2 and the second sun gear S2, thus outputting the reduced rotation (substantially the same as the reduced rotation from the first planetary gear set G1) to the output gear 2 via the second planetary carrier PC2 (rotating integrally with the second ring gear R2 and the second sun gear S2) and the second connector member M2.

Figure 3C:
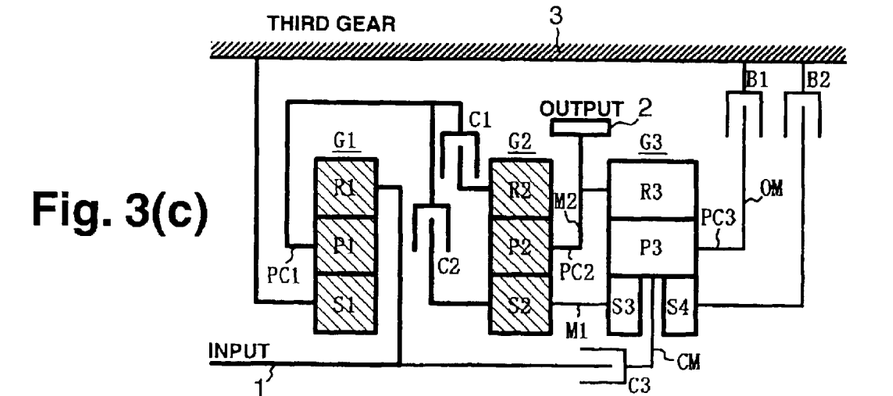
FIG. 3(c) is a typical skeleton diagram similar to that in FIG. 1 at a third gear.

FIG. 3(c) shows the torque flow paths at the third gear, with the first clutch C1, the second clutch C2 and each of the members indicated by the bold line and with the first planetary gear set G1 and the second planetary gear set G2 hatched. Hereinabove, the bold line and the hatching teach that the torque is operated.

Hereinabove, the third planetary gear set G3 may make substantially no contribution to the torque flow.

(Fourth Gear)

As is seen in FIG. 2, disengaging the second clutch C2 (which is engaged at the third gear) while engaging the third clutch C3, namely, engaging the first clutch C1 and the third clutch C3 may achieve the forward fourth gear.

At the fourth gear, in view of the second planetary gear set G2, engaging the first clutch C1 may input the reduced rotation from the first planetary gear set G1 to the second ring gear R2.

On the other hand, in view of the third planetary gear set G3, engaging the third clutch C3 may input the input rotation from the input shaft 1 to the third planetary carrier PC3 via the center member CM. Thereby, the rotation of the third sun gear S3 is more increased than the output rotation of the third ring gear R3. The thus increased rotation of the third sun gear S3 may be transmitted to the second sun gear S2 via the first connector member M1.

In view of the second planetary gear set G2, the reduced rotation is inputted from the second ring gear R2 while the increased rotation is inputted from the second sun gear S2, thus increasing the reduced rotation from the second ring gear R2 (although lower than the input rotation). The thus increased rotation is to be outputted from the second planetary carrier PC2 to the output gear 2 via the second connector member M2.

FIG. 4(a) shows the torque flow paths at the fourth gear, with the first clutch C1, the third clutch C3 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

(Fifth Gear)

As is seen in FIG. 2, disengaging the first clutch C1 (which is engaged at the fourth gear) while engaging the second clutch C2, namely, engaging the second clutch C2 and the third clutch C3 may achieve the forward fifth gear.

At the fifth gear, engaging the second clutch C2 may input the reduced rotation from the first planetary gear set G1 to the third sun gear S3 via the second sun gear S2 and the first connector member M1. Substantially simultaneously with this, engaging the third clutch C3 may input the input rotation from the input shaft 1 to the third planetary carrier PC3 via the center member CM.

In view of the third planetary gear set G3, the input rotation is inputted to the third planetary carrier PC3 while the reduced rotation from the first planetary gear set G1 is inputted to the third sun gear S3, thus increasing the input rotation. The thus increased rotation (higher than the input rotation) is to be outputted from the third ring gear R3 to the output gear 2 via the second connector member M2.

FIG. 4(b) shows the torque flow paths at the fifth gear, with the second clutch C2, the third clutch C3 and each of the members indicated by the bold line and with the first planetary gear set G1 and the third planetary gear set G3 (excluding the fourth sun gear S4) hatched. Hereinabove, the bold line and the hatching teach that the torque is operated.

(Sixth Gear)

As is seen in FIG. 2, disengaging the second clutch C2 (which is engaged at the fifth gear) while engaging the second brake B2, namely, engaging the third clutch C3 and the second brake B2 may achieve the forward sixth gear.

At the sixth gear, engaging the third clutch C3 may input the input rotation from the input shaft 1 to the third planetary carrier PC3 via the center member CM of the third planetary gear set G3. Moreover, engaging the second brake B2 may hold stationary the fourth sun gear S4 of the third planetary gear set G3 to the transmission case 3.

In view of the third planetary gear set G3, the input rotation is inputted to the third planetary carrier PC3 while the fourth sun gear S4 is held stationary to the transmission case 3, thus increasing the input rotation. The thus increased rotation is to be outputted from the third ring gear R3 to the output gear 2 via the second connector member M2.

FIG. 4(c) shows the torque flow paths at the sixth gear, with the third clutch C3, the second brake B2 and each of the members indicated by the bold line and with the third planetary gear set G3 (excluding the third sun gear S3) hatched. Hereinabove, the bold line and the hatching teach that the torque is operated.

(Reverse Gear)

As is seen in FIG. 2, engaging the second clutch C2 and the first brake B1 may achieve the reverse gear.

At the reverse gear, engaging the second clutch C2 may input the reduced rotation from the first planetary gear set G1 to third sun gear S3 via the second sun gear S2 and the first connector member M1. On the other hand, engaging the first brake B1 may hold stationary the planetary carrier PC3 to the transmission case 3.

In view of the third planetary gear set G3, the forward reduced rotation is inputted to the third sun gear S3 while the third planetary carrier PC3 may be held stationary to the transmission case 3, thus outputting the reverse reduced rotation from the third ring gear R3 to the output gear 2 via the second connector member M2.

FIG. 5 shows the torque flow paths at the reverse gear, with the second clutch C2, the first brake B1 and each of the members indicated by the bold line and with the first planetary gear set G1 and the third planetary gear set G3 (excluding the fourth sun gear S4) hatched. Hereinabove, the bold line and the hatching teach that the torque is operated.

Figure 6:
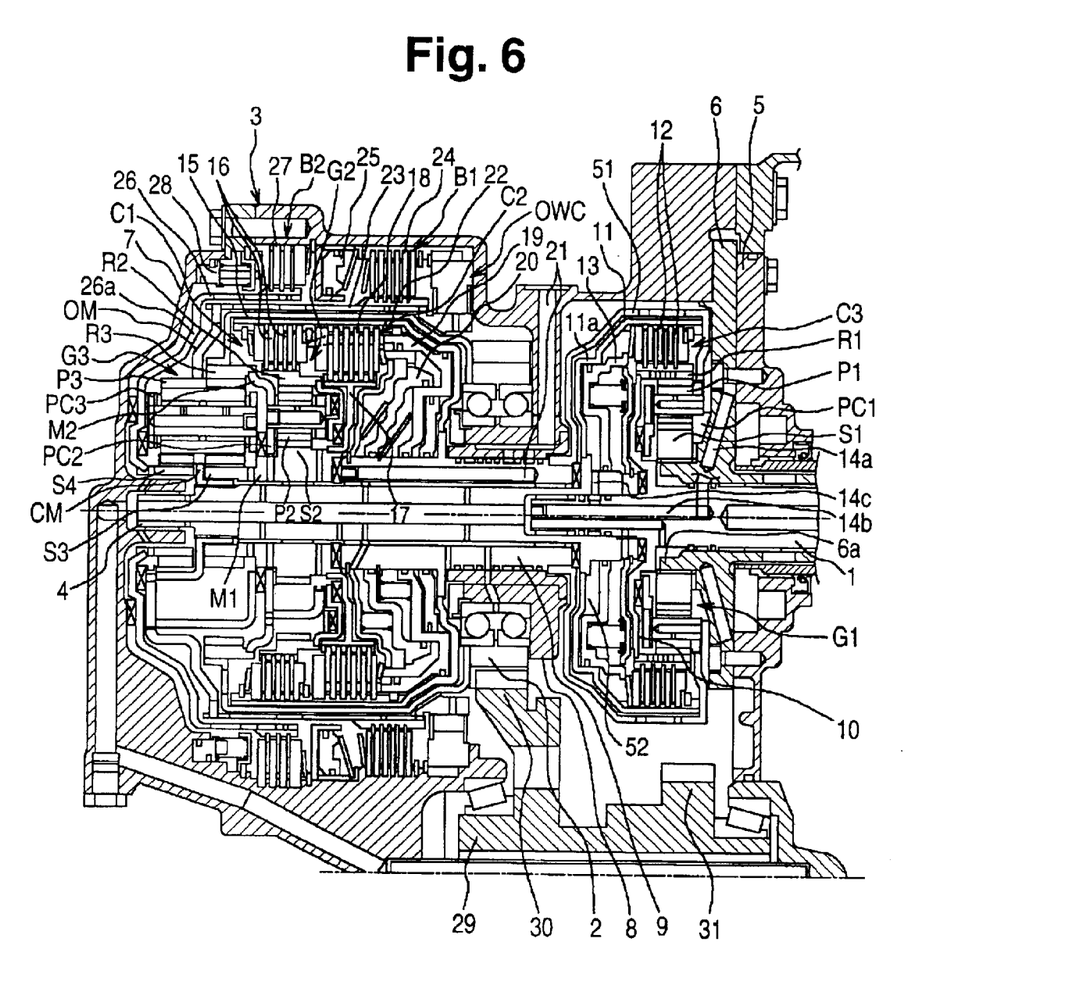
Figure 7:
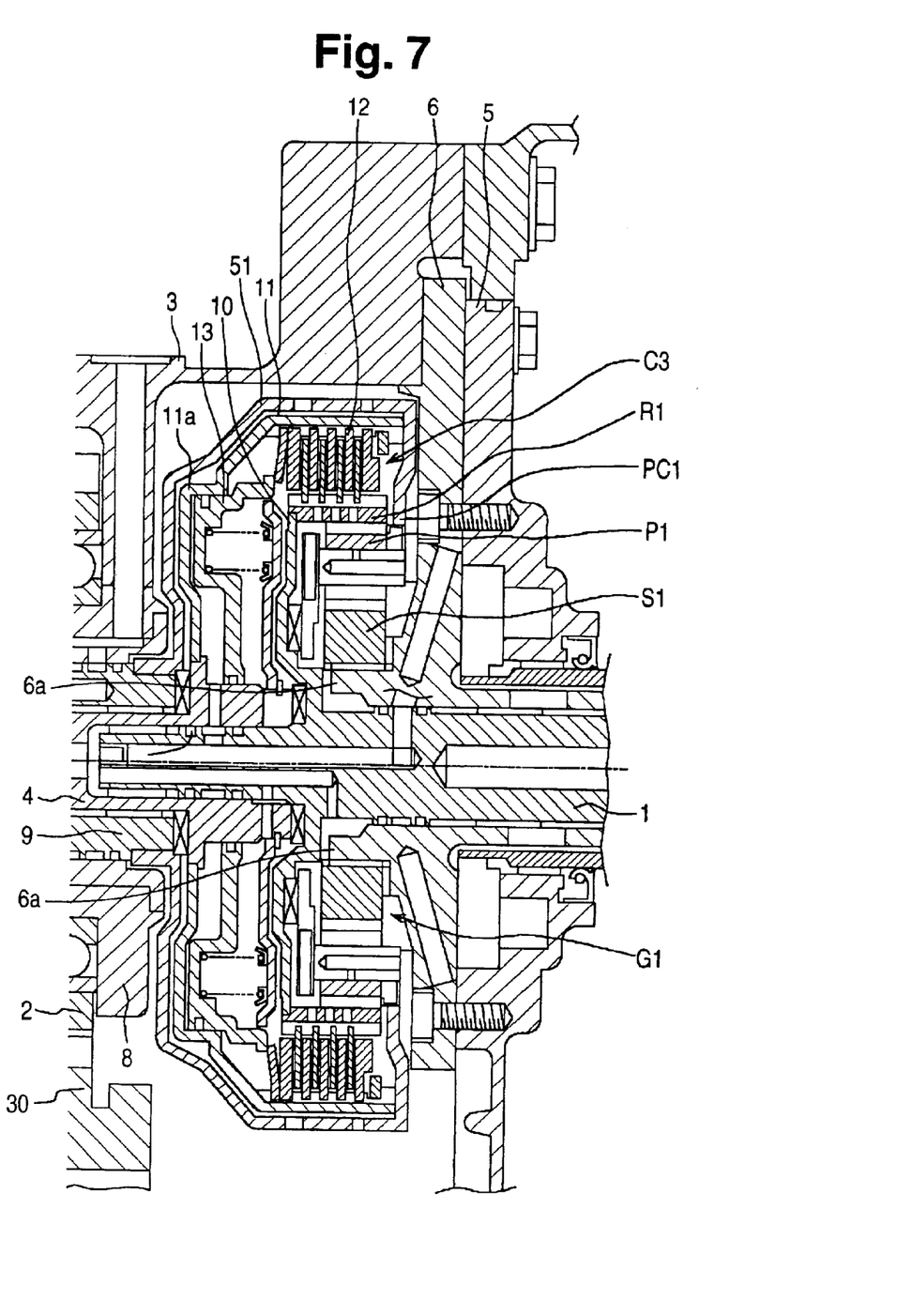
FIG. 7 shows an enlarged cross section of an essential part of the actual constitution of the speed change gear in FIG. 6, according to the embodiment of the present invention.

FIG. 6 is a view of a developed cross section showing an actual constitution of the speed change gear in FIG. 1 to FIG. 5, while FIG. 7 is an enlarged cross section of an essential part of the actual constitution of the speed change gear in FIG. 6, according to the embodiment of the present invention.

Hereinafter described is the actual constitution of the speed change gear referring to FIG. 6 and FIG. 7 showing the input portion 1 and the output portion 2 reversed relative to those shown by the skeleton diagrams in FIG. 1, FIG. 3, FIG. 4 and FIG. 5.

The input shaft 1 and a middle shaft 4 are disposed sidewise in FIG. 6 and FIG. 7 substantially coaxially in the transmission case 3, in such a manner as to mate and rotate relative to each other. In sum, the input shaft 1 and the middle shaft 4 are individually born in the transmission case 3 in such a manner as to rotate relative to the transmission case 3.

The transmission case 3 has a front end opening (right in FIG. 6 and FIG. 7) closer to the input shaft 1, which opening is blocked with a pump case having a pump housing 5 and a pump cover 6. The input shaft 1 is inserted to the pump case to be born by the pump case. An engine (not shown) is drivingly connected to a protrusion end of the input shaft 1 via a torque converter (not shown).

The middle shaft 4 has a rear end (farther side from the input shaft 1 in FIG. 6) which is rotatably born with an end cover 7 at a rear end (left in FIG. 6) of the transmission case 3.

There is provided a middle wall 8 substantially in the middle in an axial direction of the transmission case 3. The output gear 2 is rotatably born by the middle wall 8. The input shaft 1 and the middle shaft 4 define a mating portion which is rotatably born by a wall defining a center opening of the middle wall 8 via a hollow shaft 9.

Between the pump case (including the pump housing 5 and the pump cover 6) and the middle wall 8, there is defined a front space (right end of the transmission) in FIG. 6 and FIG. 7. The first planetary gear set G1 is disposed in the front space. The third clutch C3 is also disposed in the front space in such a manner as to wrap the first planetary gear set G1.

In view of the first planetary gear set G1, the first sun gear S1 is serratedly held (or mated) stationary to a center boss 6a (protruding rearward [leftward in FIG. 6 and FIG. 7]) of the pump cover 6. The first sun gear S1 is thereby continuously incapable of rotating such that the first sun gear S1 can act as a reactive force receiver. Moreover, in view of the first planetary gear set G1, the first ring gear R1 which acts as a rotation input member connects to an outer periphery of a flange 10 extending radially outward from the input shaft 1.

According to the embodiment of the present invention, as is seen in FIG. 7, the first ring gear R1 of the first planetary gear set G1 (speed reduction planetary gear set G1) and the third clutch C3 (direct clutch) disposed radially outward relative to the first ring gear R1 have the following constitution:

There is provided a clutch drum 11 extending radially outward from a front end (namely, closer to the input shaft 1) of the middle shaft 4 in such a manner as to wrap the first ring gear R1, moreover, there is provided a clutch pack 12 having clutch plates which are splined respectively with an inner periphery of the clutch drum 11 and an outer periphery of the first ring gear R1 in such a manner as to be disposed alternatingly, thus constituting the third clutch C3. The third clutch C3 is disposed on the outer periphery of the speed reduction planetary gear set G1.

A clutch hub which is an input member to the thus constituted third clutch C3 overlaps substantially axially with the first ring gear R1 of the speed reduction planetary gear set G1. The clutch hub and the first ring gear R1 are substantially the same in material. In sum, the first ring gear R1 is commonly used for the clutch hub of the third clutch C3. In other words, an outer periphery of the first ring gear R1 is provided with the clutch hub of the third clutch C3.

Hereinabove, the third clutch C3 has a clutch piston 13 (operation piston) which is disposed on a farther side (left in FIG. 7) of the first planetary gear set G1 from the oil pump case (including the pump housing 5 and the pump cover 6). The clutch piston 13 mates with an end wall 11a (facing the first planetary gear set G1) of the clutch drum 11, and with a front end of the middle shaft 4.

Receiving an operation oil pressure applied from a control valve body (not shown) via a first operation oil duct 14a, a second operation oil duct 14b and a third operation oil duct 14c to the clutch piston 13, the clutch piston 13 may make a stroke rightward in FIG. 6 and FIG. 7, thus engaging the third clutch C3.

There is provided a connector member 51 extending radially outward from the front end of the hollow shaft 9, and then is shaped substantially into a drum in such a manner as to wrap the third clutch C3. Moreover, the connector member 51 has a front end (right in FIG. 6 and FIG. 7) connecting to the first planetary carrier PC1.

As is obvious from the above description, the first planetary carrier PC1 constitutes a rotation output member of the first planetary gear set G1.

Between the middle wall 8 and the end cover 7, there is defined a rear space (rear end of the transmission). The second planetary gear set G2, the third planetary gear set G3, the first clutch C1, the second clutch C2, the first brake B1, and the second brake B2 are disposed in the rear space in FIG. 6 in the following manner:

The second planetary gear set G2 and the third planetary gear set G3 are disposed on the middle shaft 4. In this case, however, the second planetary gear set G2 is disposed nearer to the input shaft 1 than the third planetary gear set G3.

The first connector member M1 integrates the second sun gear S2 of the second planetary gear set G2 with the third sun gear S3 of the third planetary gear set G3. The thus integrated sun gear S2 and the third sun gear S3 are rotatably born on the middle shaft 4.

From substantially a center of the hollow shaft 9, there is provided a clutch drum 15 extending radially outward and then extending axially rearward (leftward in FIG. 6) to an outer periphery of the second ring gear R2, moreover, there is provided a clutch pack 16 having clutch plates which are splined respectively with an inner periphery of the clutch drum 15 and an outer periphery of the second ring gear R2 in such a manner as to be disposed alternatingly, thus constituting the first clutch C1.

As described above, the second clutch C2 is disposed nearer to the input shaft 1 than the first clutch C1 which is disposed on the outer periphery of the second planetary gear G2. With the above constitution, there is provided a clutch hub 17 fixed to the outer end of the second sun gear S2 (on the input shaft 1's side of the second sun gear S2) and extending radially outward, moreover, there is provided a clutch pack 18 having clutch plates which are splined respectively with an outer periphery of the clutch hub 17 and an inner periphery of the clutch drum 15 in such a manner as to be disposed alternatingly, thus constituting the second clutch C2.

Hereinabove, as a double piston with the clutch piston 20 sliding inside the clutch piston 19, the clutch piston 19 of the first clutch C1 and the clutch piston 20 of the second clutch C2 are in combination disposed on the second clutch C2's side away from the first clutch C1. With the above constitution, the clutch piston 20 may mate with the end wall (right in FIG. 6, and facing the second planetary gear set G2) of the clutch drum 15.

Receiving an operation oil pressure applied from operation oil ducts 21 formed individually in the middle wall 8 and the hollow shaft 9 (shown in FIG. 6 is one operation oil duct 21 only), the clutch piston 19 and the clutch piston 20 may make a stroke, thus engaging the first clutch C1 and the second clutch 20 individually.

As described above, the third planetary gear set G3 is the double sun gear planetary gear set. The third ring gear R3 is smaller in tooth width than the third pinion P3. With this, the third ring gear R3 may mesh with the third pinion P3 at an end portion near to the second planetary gear set G2, thus shortening the second connector member M2 for connecting the third ring gear R3 to the second planetary carrier PC2 of the second planetary gear set G2.

Around an outer periphery of the third ring gear R3, there is provided a tubular connector member 22 disposed in such a manner as to wrap the clutch drum 15 of the first clutch C1 and the second clutch C2. The tubular connector member 22 has a first end (left in FIG. 6) connecting to the outer periphery of the third ring gear R3 and a second end (right in FIG. 6) connecting to the output gear 2.

The third planetary carrier PC3 of the third planetary gear set G3 is fitted with the center member CM which extends radially inward via between the third sun gear S3 and the fourth sun gear S4. Moreover, substantially in an axial center of the third pinion P3, the third planetary carrier PC3 of the third planetary gear set G3 is fitted with the outer member OM extending radially outward substantially along an end face (left in FIG. 6) of the third ring gear R3.

The center member CM is drivably connected to the middle shaft 4, thus connecting the third planetary carrier PC3 to the clutch drum 11 of the third clutch C3 via the center member CM and the middle shaft 4.

The outer member OM has an outer periphery connecting to a brake hub 23. Being disposed around an outer periphery of the tubular connector member 22, the brake hub 23 extends frontward (rightward in FIG. 6) toward the middle wall 8.

There is provided a brake pack 24 having brake plates which are splined respectively with an outer periphery at a front end (right in FIG. 6) of the brake hub 23 and an inner periphery of the transmission case 3 in such a manner as to be disposed alternatingly, thus constituting the first brake B1. The first brake B1 is adapted to be engaged by a brake piston 25 which mates in the transmission case 3 in a rearward position (left in FIG. 6) of the brake pack 24.

There is provided a brake hub 26 disposed in such a manner as to cover the rear end (left in FIG. 6) of the brake hub 23. The brake hub 26 has a rear end wall 26a extending circumferentially inward substantially along a back portion of the third planetary gear set G3, moreover, an inner periphery of the rear end wall 26a of the brake hub 26 connects to the fourth sun gear S4 of the third planetary gear set G3.

There is provided a brake pack 27 having brake plates which are splined respectively with an outer periphery of the brake hub 26 and the inner periphery of the transmission case 3, thus constituting the second brake B2. The second brake B2 is adapted to be engaged by a brake piston 28 which mates in the transmission case 3 in a rearward position (left in FIG. 6) of the brake pack 27.

The above summarizes that each of the first brake B1 and the second brake B2 is disposed outside the first clutch C1 and the second clutch C2. Moreover, the first brake B1 is disposed nearer to the input shaft 1 (or the first planetary gear set G1) than the second brake B2. The first brake B1 and the second brake B2 are, however, disposed nearer to the second planetary gear set G2 than the third planetary gear set G3.

The compound planetary gear set (including the second planetary gear set G2 and the third planetary gear set G3) and the two clutches (including the first clutch C1 and the second clutch C2) are disposed on a side opposite to the input portion INPUT (input shaft 1) with respect to the speed reduction planetary gear set G1 (first planetary gear set G1).

Although being omitted from the skeleton diagrams in FIG. 1, FIG. 3, FIG. 4 and FIG. 5, a one way clutch OWC is disposed between the front end (of the brake hub 23 constituting the first brake B1) and the transmission case 3. In a disengagement state of the first brake B1, the one way clutch OWC may prevent one way rotation of the third planetary carrier PC3, thus achieving the first gear.

At the above first gear achieved by the one way clutch OWC, however, the OWC may allow a reverse rotation of the third planetary carrier PC3, thus rendering the engine brake unobtainable. Therefore, in case the engine brake is requested, the first brake B1 is engaged so as to prevent the reverse rotation of the third planetary carrier PC3.

Moreover, a counter shaft 29 extending substantially in parallel to the input shaft 1 and the middle shaft 4 is rotatably born in the transmission case 3. A counter gear 30 and a final drive pinion 31 are integrated with the counter shaft 29. The counter gear 30 may mesh with the output gear 2 while the final drive pinion 31 may mesh with the differential gear device (not shown in FIG. 6) between vehicle's drive wheels.

With the above actual constitution as is seen in FIG. 6 and FIG. 7, the speed change gear for the automatic transmission that can make a selection from the six forward gears and one reverse gear has the following constitution:

Among the clutches, the first clutch C1 and the second clutch C2 connect and disconnect the reduced rotation from the first planetary gear set G1 to the compound planetary gear set (including the second planetary gear set G2 and the third planetary gear set G3). The other clutch, namely, the third clutch C3 is the direct clutch for outputting the input rotation at the constant speed to the compound planetary gear set (including the second planetary gear set G2 and the third planetary gear set G3). The third clutch C3 is disposed radially outward relative to the first ring gear R1 of the first planetary gear set G1. Hereinabove, the first ring gear R1 has the outer periphery which is provided with the clutch hub. More specifically, the clutch hub constitutes the third clutch C3 (direct clutch C3) and is an input member to the third clutch C3.

With the above constitution, the outer periphery of the first ring gear R1 is integrated with the clutch hub of the third clutch C3, in the radial direction of the gear train, thus eliminating the need for securing an area for the following two:

1. thickness of the clutch hub, and
2. a gap between the clutch hub and the first ring gear R1.

In a state that overlapping the members at the front end (right in FIG. 6) of the transmission can shorten the overall length of the transmission, the above elimination of the area (see "thickness" in 1. and "gap" in 2. above) can prevent the transmission from becoming great in the radial direction and thereby secure a great outer diameter of the differential ring gear (not shown) relative to the distance between the main shaft and the differential shaft of the gear train. Hereinabove, being free from transmission of the speed reduction torque, the third clutch C3 is smaller than a clutch(es) disposed on other portion(s).

The above prevention of the automatic transmission from becoming enlarged in the axial direction and in the radial direction as well can reduce the gear noise and further can secure the great outer diameter of differential ring gear relative to the distance between the main shaft and the differential shaft of the gear train, resulting in improvement of the on-vehicle mountability.

Moreover, the speed change gear for the automatic transmission according to the embodiment of the present invention has the following constitution:

The first planetary gear set G1 is the single pinion planetary gear set including the first ring gear R1, the first pinion P1 meshing with the first ring gear R1, the first sun gear S1 meshing with the first pinion P1, the first planetary carrier PC1 for carrying the first pinion P1 in such a manner that the first pinion P1 can rotate. Hereinabove, the first planetary carrier PC1 acts as the rotation output member.

With the above constitution, the first planetary gear set G1 can have reduced diameter in the radial direction of the automatic transmission, thus securing the great diameter of differential ring gear relative to the distance between the main shaft and the differential shaft of the gear train.

Moreover, the speed change gear for the automatic transmission according to the embodiment of the present invention has the following constitution:

The clutch hub of the third clutch C3 and the first ring gear R1 of the first planetary gear set G1 are so disposed as to define the overlapping at least partly in the axial direction.

With the above constitution, the automatic transmission can be prevented from becoming large in the axial direction.

Moreover, the speed change gear for the automatic transmission according to the embodiment of the present invention has the following constitution:

The compound planetary gear set (including the second planetary gear set G2 and the third planetary gear set G3) and the two clutches (including the first clutch C1 and the second clutch C2) are disposed on a side opposite to the input shaft 1 with respect to the first planetary gear set G1.

With the above constitution, the input on the speed reduction side can be disposed in the vicinity of the input of the third clutch C3 (direct clutch), thus achieving a layout advantageous for the above effects.

Moreover, the clutch hub of the third clutch C3 and the first ring gear R1 of the first planetary gear set G1 are substantially the same in material, thus facilitating formation of the clutch hub of the third clutch C3 on the outer periphery of the first ring gear R1.

Although the present invention has been described above by reference to a certain embodiment, the present invention is not limited to the embodiment described above. Modifications and variations of the embodiment described above will occur to those skilled in the art, in light of the above teachings.

More specifically, the first planetary gear set G1 for the speed reduction according to the above embodiment is preferably has the constitution of the single pinion planetary gear set including the first ring gear R1 as the rotation input member and the first planetary carrier PC1 as the rotation output member. In place of the single pinion planetary gear set, a double pinion planetary gear set is applicable for the first planetary gear set G1 which double pinion type may include the first planetary carrier PC1 as the rotation input member and the first ring gear R1 as the rotation output member.

This application is based on a prior Japanese Patent Application No. P2002-207330 (filed on Jul. 16, 2002 in Japan). The entire contents of the Japanese Patent Application No. P2002-207330 from which priority is claimed is incorporated herein by reference, in order to take some protection against mis-translation or omitted portions.

The scope of the present invention is defined with reference to the following claims.

What is claimed is:

1. A speed change gear for an automatic transmission, comprising:
   1) an input portion for inputting an input rotation from a power source;
   2) an output portion disposed substantially coaxially with the input portion and outputting an output rotation of the speed change gear; and
   3) a plurality of planetary gear sets including a compound planetary gear set, the plurality of the planetary gear sets providing a plurality of power conductive paths to an area defined between the input portion and the output portion, the plurality of the planetary gear sets comprising:
      first clutch;
      a second clutch;
      a third clutch;
      a first brake; and
      a second brake,
   wherein the clutches and the brakes are configured to be selectively engaged and disengaged in such a manner that the planetary gear sets change a rotation from the input portion at a corresponding gear change ratio by selecting one of the plurality of the power conductive paths, thereby outputting the thus changed rotation to the output portion,
   wherein combinations of engaged clutches and brakes and combinations of multiple engaged clutches define at least six successive forward gears and one reverse gear,
   wherein one of the plurality of the planetary gear sets is a speed reduction planetary gear set for continuously reducing the input rotation and outputting the thus reduced rotation,
   wherein in the first through the fifth forward gears, the first clutch and/or the second clutch is/are engaged to transfer the reduced rotation from the speed reduction planetary gear set to the compound planetary gear set,
   wherein in the sixth forward gear, neither the first clutch nor the second clutch is engaged,
   wherein the third clutch, which is a direct clutch for outputting the input rotation to the compound planetary gear set, is disposed radially outward relative to a first ring gear of the speed reduction planetary gear set,
   wherein the first ring gear has an outer periphery that is provided with a clutch hub, and
   wherein the clutch hub constitutes the direct clutch and is an input member to the third clutch.

2. The speed change gear for the automatic transmission as claimed in claim 1, wherein:
   the speed reduction planetary gear set includes:
      a first pinion meshing with the first ring gear,
      a first sun gear meshing with the first pinion, and
      a first planetary carrier for carrying the first pinion in such a manner that the first pinion rotates; and
   the speed reduction planetary gear set is a single pinion planetary gear set having the first ring gear as a rotation input member and the first planetary carrier as a rotation output member.

3. The speed change gear for the automatic transmission as claimed in claim 1, wherein:
   the speed change gear includes the first clutch and the second clutch for being engaged and disengaged to transfer the reduced rotation from the speed reduction planetary gear set to the compound planetary gear set; and
   the clutch hub of the direct clutch and the first ring gear of the speed reduction planetary gear set are so disposed as to define an overlapping at least partly in an axial direction.

4. The speed change gear for the automatic transmission as claimed in claim 1, wherein the compound planetary gear set, the first clutch, and the second clutch are disposed on a side opposite to the input portion with respect to the speed reduction planetary gear set.

5. The speed change gear for the automatic transmission as claimed in claim 1, wherein the clutch hub of the direct clutch and the first ring gear of the speed reduction planetary gear set are substantially the same in material.

6. The speed change gear for the automatic transmission as claimed in claim 1, wherein:
   engaging the first clutch and the first brake brings about the first forward gear;
   engaging the first clutch and the second brake brings about the second forward gear;

engaging the first clutch and the second clutch brings about the third forward gear;

engaging the first clutch and the third clutch brings about the fourth forward gear;

engaging the second clutch and the third clutch brings about the fifth forward gear;

engaging the third clutch and the second brake brings about the sixth forward gear; and engaging the second clutch and the first brake brings about the reverse gear.

7. A speed change gear for an automatic transmission, comprising:

1) an input portion for inputting a rotation from a power source;

2) an output portion disposed substantially coaxially with the input portion;

3) three planetary gear sets including a first planetary gear set, a second planetary gear set and a third planetary gear set for providing a plurality of power conductive paths to an area defined between the input portion and the output portion; and 4) a first clutch, a second clutch, a third clutch, a first brake and a second brake to be selectively engaged and disengaged in such a manner that the three planetary gear sets change a rotation from the input portion at a corresponding gear change ratio by selecting one of the plurality of the power conductive paths, thereby outputting the thus changed rotation to the output portion, the first clutch, the second clutch, the third clutch, the first brake and the second brake making a combination of engagement and disengagement, wherein the combination makes a selection from at least six forward gears and one reverse gear, wherein one of the three planetary gear sets is a speed reduction planetary gear set for continuously reducing the inputted rotation and outputting the thus reduced rotation, wherein one of the remaining two planetary gear sets of the three planetary gear sets is a double sun gear planetary gear set comprising:

two sun gears;

a common pinion meshing with the two sun gears in common;

one ring gear meshing with the common pinion; and a planetary carrier for carrying the common pinion in such a manner that the common pinion rotates, the planetary carrier being adapted to input and output a rotation from the two sun gears via a center member, wherein the other of the remaining two planetary gear sets of the three planetary gear sets is a single pinion planetary gear set comprising:

one sun gear;

a pinion meshing with the one sun gear;

one ring gear meshing with the pinion; and a planetary carrier for carrying the pinion in such a manner that the pinion rotates, wherein, the first clutch and the second clutch are engaged and disengaged to transfer the reduced rotation from the speed reduction planetary gear set to the remaining two planetary gear sets, wherein the third clutch, which is a direct clutch outputting the input rotation to the remaining two planetary gear sets, is disposed radially outward relative to a first ring gear of the speed reduction planetary gear set, wherein the first ring gear has an outer periphery that is provided with a clutch hub, and wherein the clutch hub constitutes the direct clutch and is an input member to the third clutch.

* * * * *